US012657320B2

(12) United States Patent
Gan et al.

(10) Patent No.: US 12,657,320 B2
(45) Date of Patent: Jun. 16, 2026

(54) SECURE CONTACT TRACING BETWEEN COMPUTING DEVICES

(71) Applicant: INTERNATIONAL BUSINESS MACHINES CORPORATION, Armonk, NY (US)

(72) Inventors: Xiang Zhen Gan, Xian (CN); Hai Hui Wang, Xian (CN); Guangya Liu, Cary, NC (US); Peng Li, Xian (CN); Ying Mo, Beijing (CN); Natalie Brooks Powell, Bolingbrook, IL (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 18/362,244

(22) Filed: Jul. 31, 2023

(65) Prior Publication Data

US 2025/0045434 A1 Feb. 6, 2025

(51) Int. Cl.
*G06F 21/62* (2013.01)

(52) U.S. Cl.
CPC ................................ *G06F 21/6218* (2013.01)

(58) Field of Classification Search
CPC .................................................. G06F 21/6218
(Continued)

(56) References Cited

U.S. PATENT DOCUMENTS 7,617,531 B1 * 11/2009 Chauhan ............. H04L 63/0263
726/13
2010/0125569 A1 * 5/2010 Nair ....................... G06Q 30/02
707/E17.055
(Continued)

FOREIGN PATENT DOCUMENTS

CN 105339968 A * 2/2016 ......... G06Q 30/0256
CN 105912562 A * 8/2016 ............. G06F 16/26
(Continued)

OTHER PUBLICATIONS

Tu Guoqing, Yang Yanhao, Liu Shubo. Vulnerability Analysis of Geohash Code Against k-nearest Neighbor Attack. Netinfo Security[J], 2021, 21(2): 10-15doi: 10.3969/j.issn.1671-1122.2021.02.002 (Year: 2021).*

(Continued)

*Primary Examiner* — Luu T Pham
*Assistant Examiner* — Walter J Malinowski
(74) *Attorney, Agent, or Firm* — Michael Petrocelli, Esq.; Rachel L. Pearlman, Esq.; Heslin Rothenberg Farley & Mesiti P.C.

(57) ABSTRACT

Computer implemented methods, systems, and computer program products include program code executing on a processor(s) that obtains location data from a client (an encrypted and a timestamp comprising). The processor(s) stores, in a graphing database, a vertex representing the user in a graph. The processor(s) determines, based on comparing the encrypted geohash and the timestamp of the vertex to values in one or more vertices in the graph, that at least one additional user intersected with the user in physical space proximate to a given time. The processor(s) generates or updates, between the vertex of the user and the at least one vertex representing the at least one additional user, an edge in the graph to represents a direct contact between. The processor(s) applies, to the graph, a breath first search algorithm to the graph to identify one or more indirect contacts between users.

18 Claims, 9 Drawing Sheets

200

210 — PROGRAM CODE EXECUTING ON ONE OR MORE PROCESSORS OBTAINS A LOCATION OF A CLIENT AND STORES THE CLIENT LOCATION TO LOCAL STORAGE

220 — PROGRAM CODE ACCESSES A GRAPH DATABASE TO STORE A CLIENT OR USER IDENTIFIER AS A VERTEX

230 — PROGRAM CODE DETERMINES IF THE CLIENT (VERTEX) INTERSECTED IN REAL SPACE WITH ANY OTHER CLIENT (REPRESENTED BY OTHER VERTICES) AND STORES DATA RELATED TO THE INTERSECTION OF THE CLIENT AND ANOTHER CLIENT AS AN EDGE

240 — PROGRAM CODE IDENTIFIES DIRECT CONTACTS AND INDIRECT CONTACTS BY APPLYING A BLS ALGORITHM TO THE GRAPH GENERATED BY THE PROGRAM CODE IN THE GRAPH DATABASE

250 — PROGRAM CODE GENERATES AND SENDS REAL-TIME NOTIFICATIONS BASED ON IDENTIFYING CONTACTS AND INDIRECT CONTACTS BETWEEN CLIENTS BASED ON THE BLS ALGORITHM-BASED ANALYSIS OF THE GRAPH

260 — PROGRAM CODE UPDATES THE GRAPH WITH THE SUSPECTED INFECTION DATA

270 — PROGRAM CODE PURGES STALE DATA

(58) Field of Classification Search
USPC .......................................................... 726/26
See application file for complete search history.

(56) References Cited

U.S. PATENT DOCUMENTS

| | | | | |
|---|---|---|---|---|
| 2012/0191724 | A1* | 7/2012 | Tucek | G06F 16/113 |
| | | | | 707/747 |
| 2012/0324241 | A1* | 12/2012 | Oshida | H04L 9/002 |
| | | | | 713/189 |
| 2012/0324310 | A1* | 12/2012 | Oshida | H03M 13/63 |
| | | | | 714/755 |
| 2014/0324582 | A1* | 10/2014 | Suleman | G06Q 30/0256 |
| | | | | 705/14.54 |
| 2015/0339054 | A1* | 11/2015 | Lin | G06F 3/04886 |
| | | | | 726/26 |
| 2017/0300657 | A1* | 10/2017 | Barrett | G16H 50/50 |
| 2018/0316900 | A1* | 11/2018 | Papakipos | H04N 5/772 |
| 2019/0251123 | A1* | 8/2019 | Yamane | G06F 16/285 |
| 2019/0386969 | A1* | 12/2019 | Verzun | G06F 21/606 |
| 2021/0168152 | A1* | 6/2021 | Herrema, III | G06F 16/29 |
| 2021/0232377 | A1* | 7/2021 | Bae | G06F 21/577 |
| 2021/0344480 | A1* | 11/2021 | Brown | H04L 9/0643 |
| 2022/0067738 | A1* | 3/2022 | Fang | G06Q 20/389 |
| 2022/0092179 | A1* | 3/2022 | Zhang | G06F 21/554 |
| 2022/0350897 | A1* | 11/2022 | Ho | G06F 21/602 |
| 2022/0351523 | A1* | 11/2022 | Kim | G06V 10/82 |
| 2022/0383349 | A1* | 12/2022 | Yan | G06F 16/285 |
| 2023/0268038 | A1* | 8/2023 | Chheng | G16H 50/80 |
| | | | | 705/3 |
| 2023/0280477 | A1* | 9/2023 | Seth | G16H 50/30 |
| | | | | 342/357.23 |
| 2023/0289460 | A1* | 9/2023 | Gehani | G06F 11/3466 |
| 2024/0388592 | A1* | 11/2024 | Dash | H04L 9/0631 |

FOREIGN PATENT DOCUMENTS

| | | | | | |
|---|---|---|---|---|---|
| CN | 108737323 | A | * | 11/2018 | H04L 9/3297 |
| CN | 110602230 | A | * | 12/2019 | G06Q 50/265 |
| CN | 111127230 | A | * | 5/2020 | G06Q 50/01 |
| CN | 111737538 | A | * | 10/2020 | G06F 18/22 |
| CN | 112365996 | A | | 2/2021 | |
| CN | 113470833 | A | * | 10/2021 | G16H 50/80 |
| CN | 113672690 | A | * | 11/2021 | G06F 16/24 |
| CN | 113891369 | A | * | 1/2022 | H04W 24/02 |
| CN | 114639487 | A | * | 6/2022 | G06F 16/24575 |
| CN | 114913990 | A | | 8/2022 | |
| CN | 115565693 | A | | 1/2023 | |
| JP | 2000322514 | A | * | 11/2000 | |
| JP | 3798179 | B2 | * | 7/2006 | |
| KR | 102399702 | B1 | * | 5/2022 | G06Q 50/26 |
| WO | WO-2023043807 | A1 | * | 3/2023 | H04L 9/3268 |

OTHER PUBLICATIONS

Moussalli, Roger, Mudhakar Srivatsa, and Sameh Asaad. "Fast and flexible conversion of geohash codes to and from latitude/ longitude coordinates." In 2015 IEEE 23rd annual international symposium on field-programmable custom computing machines, pp. 179-186. IEEE, 2015. (Year: 2015).*
Obert, James, and Adrian Chavez. "Graph-based event classification in grid security gateways." In 2019 Second International Conference on Artificial Intelligence for Industries (AI4I), pp. 63-66. IEEE, 2019. (Year: 2019).*
"A Knowledge Graph-Based Method for Epidemic Contact Tracing in Public Transportation" Chen, Tian. Feb. 7, 2023, 22 pages.
"Digital Contact Tracing and Network Theory to Stop the Spread of COVID-19 Using Big Data on Human Mobility Geo-localization" Serafino M, Monteiro HS, Luo S, Reis SDS, Igual C, Lima Neto AS, et al. Apr. 11, 2023, 17 pages.
"Neighbous: Get Neighbours to Geohashes" Accessed online Apr. 12, 2023, 2 pages.
"KHOVID: Interoperable Privacy Preserving Digital Contact Tracing" Xiang Chang. Dec. 17, 2020, 14 pages.
"Secure and Efficient Trajectory-Based Contact Tracing using Trusted Hardware" Fumiyuki Kato et al. Nov. 4, 2020, 10 pages.
"Use of Temporal Contact Graphs to Understand the Evolution of COVID-19 Through Contact Tracing Data" Mincheng Wu et al. Nov. 4, 2022, 10 Pages.

* cited by examiner

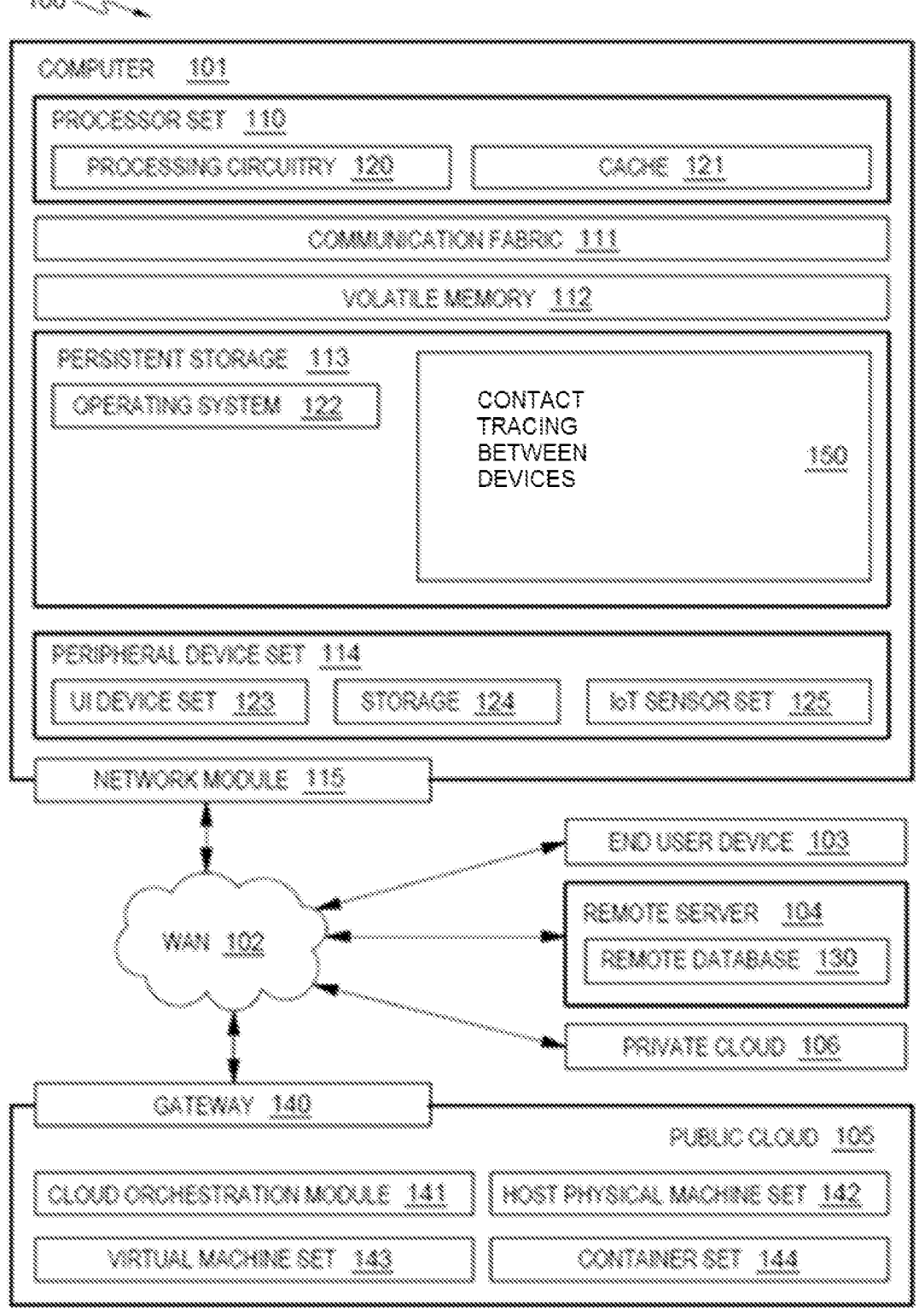

100

COMPUTER   101

PROCESSOR SET   110

PROCESSING CIRCUITRY   120          CACHE   121

COMMUNICATION FABRIC   111

VOLATILE MEMORY   112

PERSISTENT STORAGE   113

OPERATING SYSTEM   122

CONTACT TRACING BETWEEN DEVICES                    180

PERIPHERAL DEVICE SET   114

UI DEVICE SET   123          STORAGE   124          IoT SENSOR SET   125

NETWORK MODULE   115

WAN   102

END USER DEVICE   103

REMOTE SERVER   104

REMOTE DATABASE   130

PRIVATE CLOUD   106

GATEWAY   140

PUBLIC CLOUD   105

CLOUD ORCHESTRATION MODULE   141          HOST PHYSICAL MACHINE SET   142

VIRTUAL MACHINE SET   143          CONTAINER SET   144

FIG. 1

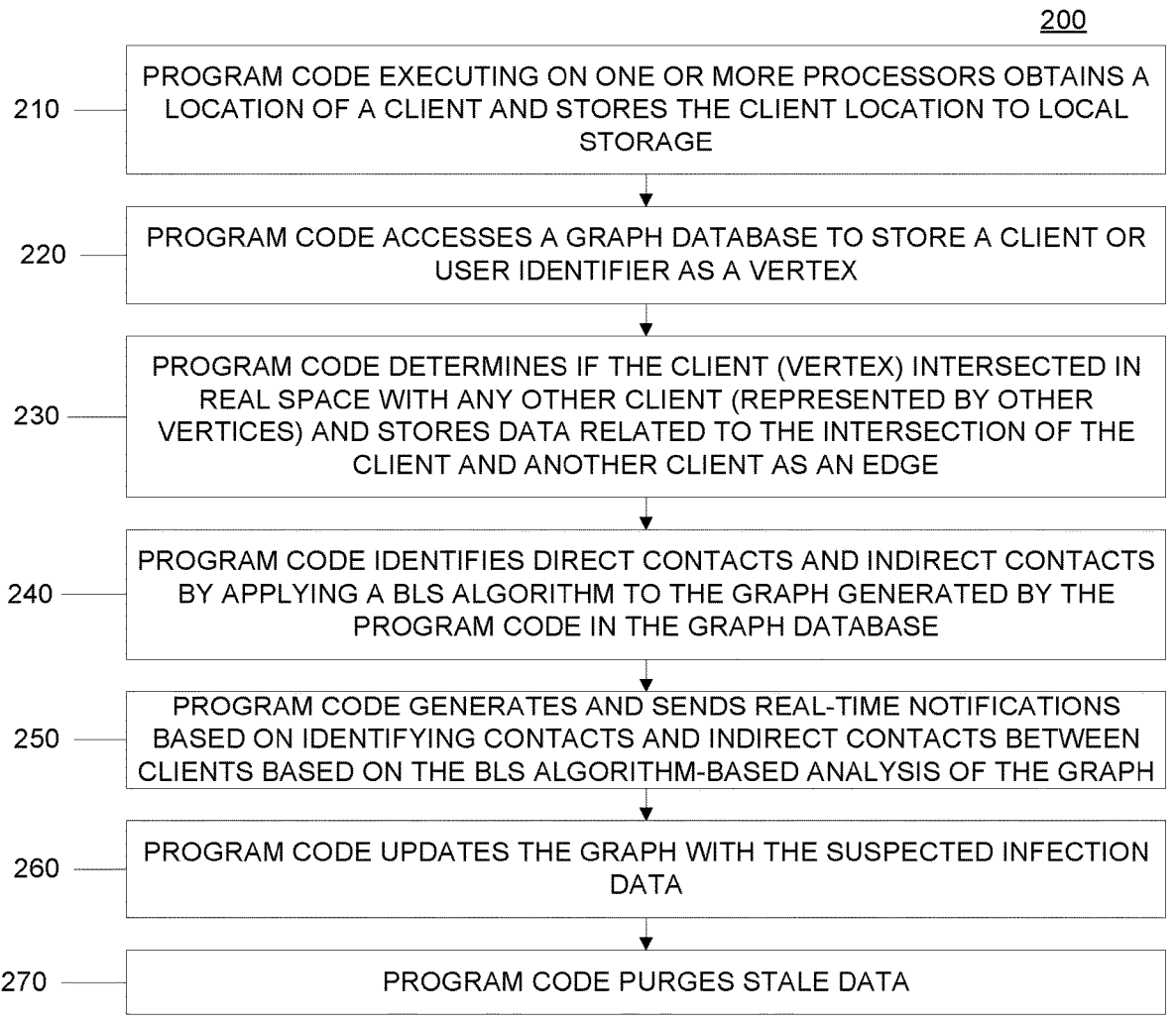

200

210 — PROGRAM CODE EXECUTING ON ONE OR MORE PROCESSORS OBTAINS A LOCATION OF A CLIENT AND STORES THE CLIENT LOCATION TO LOCAL STORAGE

220 — PROGRAM CODE ACCESSES A GRAPH DATABASE TO STORE A CLIENT OR USER IDENTIFIER AS A VERTEX

230 — PROGRAM CODE DETERMINES IF THE CLIENT (VERTEX) INTERSECTED IN REAL SPACE WITH ANY OTHER CLIENT (REPRESENTED BY OTHER VERTICES) AND STORES DATA RELATED TO THE INTERSECTION OF THE CLIENT AND ANOTHER CLIENT AS AN EDGE

240 — PROGRAM CODE IDENTIFIES DIRECT CONTACTS AND INDIRECT CONTACTS BY APPLYING A BLS ALGORITHM TO THE GRAPH GENERATED BY THE PROGRAM CODE IN THE GRAPH DATABASE

250 — PROGRAM CODE GENERATES AND SENDS REAL-TIME NOTIFICATIONS BASED ON IDENTIFYING CONTACTS AND INDIRECT CONTACTS BETWEEN CLIENTS BASED ON THE BLS ALGORITHM-BASED ANALYSIS OF THE GRAPH

260 — PROGRAM CODE UPDATES THE GRAPH WITH THE SUSPECTED INFECTION DATA

270 — PROGRAM CODE PURGES STALE DATA

Server
411

406 userid:xxxxxxxx
location:c2e680d6d40e2025
timestamp:xxxx
zone: sn

Mobile client
401

521                    531                    541

108.727805,34.51907    →geohash→    wqjk6hj0j    →md5→    c2e680d6d40e2025

646                                    656

705                      715                      720                      725

SECURE CONTACT TRACING BETWEEN COMPUTING DEVICES

BACKGROUND

The present invention relates generally to the field of data security, in particular, as it relates to contact tracing.

A pandemic is a widespread occurrence of an infectious disease over a whole country or the world at a particular time. One tool to help in containing the spread of the disease or to at least mitigate the impacts of the pandemic is contact tracing. Contact tracing is a public health practice that health departments use to identify and notify people who have been exposed to someone with an infectious disease. By notifying individuals who have been exposed, the individuals can be empowered to seek assistance and/or isolate in order to prevent further spread of the infectious disease. Unfortunately, tracing contacts and notifying exposed individuals can create privacy and security issues.

To enable contact tracing, some cities utilize a contact tracing-based approach that includes the use of Healthy-QR codes (quick response code) which indicate, for example, whether individuals are infectious and/or have been in contact with infectious individuals. In practice, a healthcare provider, facility, or government entity can set a Healthy-QR color code of an individual (e.g., patient) to red, yellow, or green. Healthcare providers can identify patients assigned a red code (e.g., meaning they are ill) for treatment. Individuals with the yellow code (e.g., probable exposure but not ill) with follow-up instructions, and can alert the individuals to seek follow-up assistance (check-ups to make sure health is maintained). Individuals with a green Healthy-QR color are presumed to be healthy, and these individuals are also presumed to have not been exposed to an individual with an infectious disease. Facilities can use these QR codes, and the data represented by the QR codes, when routing individuals through spaces to minimize spread of an infectious disease. For example, individuals with red codes may be routed down a given hallway while yellow codes are routed down another and only green codes are given free range of public shared spaces in a facility.

SUMMARY

Shortcomings of the prior art are overcome, and additional advantages are provided through the provision of a computer-implemented method for contact tracing. The method can include: obtaining, by one or more processors, location data from a client, wherein the location data comprises an identifier of a user utilizing the client, an encrypted geohash representing a physical location of the client at the obtaining, and a timestamp comprising a time of the obtaining; storing, by the one or more processors, in a graphing database communicatively coupled to the one or more processors, a vertex representing the user, in a graph, wherein properties of the vertex comprise the location data; determining, by the one or more processors, based on comparing the encrypted geohash and the timestamp of the vertex to values in one or more vertices in the graph, wherein each vertex of the one or more vertices represents an additional user, that at least one additional user intersected with the user in physical space proximate to a given time, wherein an encrypted geohash of at least one vertex representing the at least one additional user matches the encrypted geohash of the client and a timestamp of the at least one vertex representing the at least one additional user is within a predetermined interval of the timestamp of the client; generating or updating, by the one or more processors, between the vertex of the user and the at least one vertex representing the at least one additional user, an edge in the graph, wherein the edge represents a direct contact between the user and the at least one additional user; and applying, by the one or more processors, to the graph, a breath first search algorithm to the graph to identify one or more indirect contacts between users represented as vertices in the graph including indirect contacts between the user and other users represented as vertices.

Shortcomings of the prior art are overcome, and additional advantages are provided through the provision of a computer program product for contact tracing. The computer program product comprises a storage medium readable by one or more processors and storing instructions for execution by the one or more processors for performing a method. The method includes, for instance: obtaining, by the one or more processors, location data from a client, wherein the location data comprises an identifier of a user utilizing the client, an encrypted geohash representing a physical location of the client at the obtaining, and a timestamp comprising a time of the obtaining; storing, by the one or more processors, in a graphing database communicatively coupled to the one or more processors, a vertex representing the user, in a graph, wherein properties of the vertex comprise the location data; determining, by the one or more processors, based on comparing the encrypted geohash and the timestamp of the vertex to values in one or more vertices in the graph, wherein each vertex of the one or more vertices represents an additional user, that at least one additional user intersected with the user in physical space proximate to a given time, wherein an encrypted geohash of at least one vertex representing the at least one additional user matches the encrypted geohash of the client and a timestamp of the at least one vertex representing the at least one additional user is within a predetermined interval of the timestamp of the client; generating or updating, by the one or more processors, between the vertex of the user and the at least one vertex representing the at least one additional user, an edge in the graph, wherein the edge represents a direct contact between the user and the at least one additional user; and applying, by the one or more processors, to the graph, a breath first search algorithm to the graph to identify one or more indirect contacts between users represented as vertices in the graph including indirect contacts between the user and other users represented as vertices.

Shortcomings of the prior art are overcome, and additional advantages are provided through the provision of a system for contact tracing. The system includes: a memory, one or more processors in communication with the memory, and program instructions executable by the one or more processors via the memory to perform a method. The method includes, for instance: obtaining, by the one or more processors, location data from a client, wherein the location data comprises an identifier of a user utilizing the client, an encrypted geohash representing a physical location of the client at the obtaining, and a timestamp comprising a time of the obtaining; storing, by the one or more processors, in a graphing database communicatively coupled to the one or more processors, a vertex representing the user, in a graph, wherein properties of the vertex comprise the location data; determining, by the one or more processors, based on comparing the encrypted geohash and the timestamp of the vertex to values in one or more vertices in the graph, wherein each vertex of the one or more vertices represents an additional user, that at least one additional user intersected with the user in physical space proximate to a given time, wherein an encrypted geohash of at least one vertex representing the at least one additional user matches the encrypted geohash of the client and a timestamp of the at least one vertex representing the at least one additional user is within a predetermined interval of the timestamp of the client; generating or updating, by the one or more processors, between the vertex of the user and the at least one vertex representing the at least one additional user, an edge in the graph, wherein the edge represents a direct contact between the user and the at least one additional user; and applying, by the one or more processors, to the graph, a breath first search algorithm to the graph to identify one or more indirect contacts between users represented as vertices in the graph including indirect contacts between the user and other users represented as vertices.

Additional aspects of the present disclosure are directed to systems and computer program products configured to perform the methods described above. Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 depicts one example of a computing environment to perform, include and/or use one or more aspects of the present disclosure;

FIG. 2 is a workflow that provides an overview of various aspects performed by the program code (executing on one or more processors) in some embodiments of the present disclosure;

DETAILED DESCRIPTION

Figure 3:
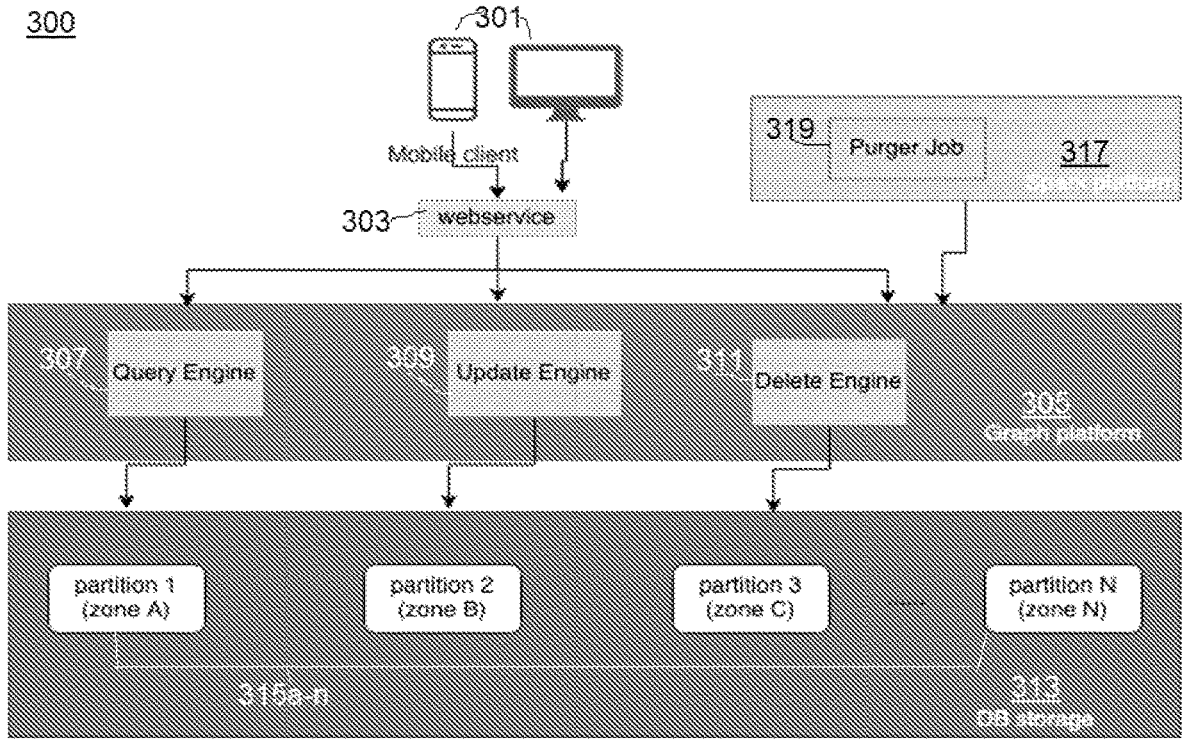
FIG. 3 illustrates a technical architecture that executes various aspects of some embodiments of the present disclosure.

Contact tracing is used to mitigate the spread of infectious diseases. There are various challenges that hinder the efficacy of this process when enabled through existing approaches. To enable contact tracing, some cities utilize a Healthy-QR code (quick response code) which indicates whether an individual has been in contact with an infectious individual. Healthy-QR code implementations to enact contact tracing have various drawbacks. First, this technology does not protect the privacy of an individual. Second, the accuracy of who has been contact with an infected individual cannot always be established. Third, although direct contacts can be captured using contract tracing and this methodology, indirect contacts are not captured. Other approaches to contact tracing utilize Bluetooth technology but there are also drawbacks to these approaches. Namely, the system does not utilize any overall contact number from a centralized healthcare authority to predict the prevalence of a given disease, and, as with the Healthy-QR approach, this existing approach also cannot trace indirect contacts.

Although the example used for contact tracing is contact tracing for infectious diseases, the examples here provide information regarding whether devices (with unique identifiers) have been within a vicinity of each other during a defined window of time, without the program code that determines whether the devices where within a vicinity of each other obtaining the actual physical location of any of the devices. In some examples herein, for reasons of processing efficiency (e.g., limiting the scope of database queries), the program code making the proximity determination can obtain information identifying a large geographic area (or zone) in which the devices are located. For example, the program code can obtain information indicating that a device is in one state, province, or country, but nothing more specific. Additionally, because the program code obtains identifiers of the devices and not of individuals, the program code making the proximity determination not only does not obtain an actual location of any device, it also does not obtain any personally identifiable information (PID) from an owner of the device. The functionality of determining proximity of devices without actual location information can be utilized in contexts apart from contact tracing. For example, a device can be associated with a biological sample and not a person and certain of the examples herein can determine whether the biological sample was proximate to other entities (represented by devices) within a given time period. For illustrative purposes only, herein, the disclosed examples are applied to contact tracing to illustrate and demonstrate a practical application of these techniques. This is a non-limiting example as there are other scenarios where there is utility to understanding whether two devices are proximate to each other at a given time while preserving the privacy of a user of the device.

The term "location data" is used in the context of this disclosure not to represent an actual location of a user. Rather, the "location data" received or obtained from a client by program code executing at a server-side in the examples herein and utilized for contract tracing does not include a real physical location of an individual. Rather, the "location data", from the perspective of the program code at the server, are parameters that include an identifier for a client and an irreversible encryption that it cannot unencrypt but can merely compare to irreversible encryptions of other clients. In some examples, the location data can include an indicator of a large geographic region, such as a state or a province. However, the precise location of the individual cannot be determined by the program code from the "location data" described herein.

Embodiments of the present invention include computer-implemented methods, computer program products, and computer systems provide an efficient and secure approach to tracing contacts once one or more individuals are infected with an infectious disease. In embodiments of the present invention, program code executing on one or more processors sends a valid geohash location to a knowledge graph system. Thus, in the examples herein, the program code does not collect a real user location, but, rather, an irreversible encryption, which the program code can utilize to determine whether users are proximate to each other and whether there have been any direct or indirect contacts between users. Existing approaches rely on tracking actual locations of users while the real locations of users are neither collected nor utilized in the examples herein. In the examples herein, when an individual is in contact with another, as opposed to in existing approaches, the individual does not need to utilize a personal computing device (e.g., a client) to scan a location QR code. The program code can aggregate contacts and generate a contact relationship between the individual and other individuals. The program code can also assist in analyzing and predicting the prevalence of a disease. By utilizing an encrypted geohash instead of a global positioning system (GPS) to determine the location of individuals utilizing the contact tracing system described herein, the program code of the examples herein can determine, more rapidly than using GPS, whether two individuals (e.g., the clients utilized by the individuals or users) have intersected while protecting the privacy of the users. In some embodiments of the present invention, on the server-side, the program code does not retain an actual location of an individual. Instead, the program code can retain a proximity of a user to other users by determining that clients each have similar or matching encrypted geohash at a given time. Thus, the program code, in these examples, protects the privacy of the individual because the actual location is not retained in a database. Embodiments of the present invention also respect the privacy and security of individual users because these users can opt into participating in the contact tracing. Thus, unlike with some existing systems that track users utilizing GPS and other means, the program code in embodiments of the present invention solicits agreement from a user to participate in a contact tracing program. The personally identifiable information (PDI) of the user is not utilized in embodiments of the present invention and the locations of the individuals are provided by the users because the users chose to participate in the contact tracing program enabled by the aspects described herein. As will be discussed in greater detail, certain of the examples herein include an effect location collection policy which can reduce send invalid data and can conserve (device/battery) power. Unlike the existing approaches which cannot trace indirect contacts, in embodiments of the present invention, the program code generates a knowledge graph to persist the contacts data, which can trace the direct and indirect contacts. The knowledge graph can be utilized by experts to analyze overall disease prevalence during a given time period.

Geohash is a public domain geocode system which encodes a geographic location into a short string of letters and digits. A user can obtain a geohash by providing a location to be geocoded (e.g., an address, or latitude and longitude coordinates) in a single input box (as the request) and the program code will utilize these data to generate a geohash. As noted above, embodiments of the present invention generate and utilize an encrypted geohash as user location. The program code in some embodiments of the present invention does not retain on the server side an actual location of an individual and in this way, protects the privacy of the user. The location data the program code obtains, the encrypted geohash from each participating client, enables the program code to determine if and when two people have intersected (in movement, location). When clients are proximate to each other, the encrypted geohash of each client will be the same as that of the proximate client.

Embodiments of the present invention provide significantly more than existing contact tracing methods. One issue with existing contact tracing systems is that they accumulate a tremendous amount of data and these data can negatively impact both accuracy as well as the performance of the systems utilized both to analyze these data and to alert affected individuals. Power usage, for devices conveying these data, including personal computing devices, is of particular concern because if a battery on a device discharges, an individual utilizing the device an neither send nor receive crucial data to enable effective contact tracing. Existing approaches can cause batteries to discharge because the location data of the devices is sent continuously in order to effect contact tracing. Embodiments of the present invention conserve device power by implementing a location collection policy that reduces the sending of invalid (or duplicative) data and thus, conserves the power of the devices and hence, improved system efficacy. Embodiments of the present invention provide significantly more because of the insights that the program code provides into the infections for which it enacts contact tracing. For example, the knowledge graph generated by the program code in some embodiments of the present invention enables the program code to persist the contacts data as well as to trace the direct and indirect contacts. Existing approaches are unable to trace indirect contacts and hence, the ability to trace indirect contacts represents a significant improvement over existing approaches. In addition to the indirect contact tracing, the examples herein provide further advantages over existing approached as the examples herein generates data and produces models of these data sufficient to enable experts to analyze overall disease prevalence during various periods of time. Inherent in many existing methods are compromises to user privacy because contact tracing, in general, can rely, to some degree, on location tracking. The examples herein mitigate this privacy concern because program code in the embodiments herein can utilize an encrypted geohash, rather than GPS, to determine whether two clients have intersected. Thus, the privacy of a user is protected because an intersection of clients (devices) is noted by the program code rather than individually tracking individuals (e.g., via the clients utilizing GPS) continuously.

Various aspects of embodiments of the present invention are inextricably tied to computing and also directed to a practical application. Embodiments of the present invention utilize various aspects of computing technologies to provide improved infectious disease tracking, prediction, and trend analysis. The functionality of the aspects herein is inextricably tied to elements of a computing infrastructure, including software and hardware, and utilizes these elements to achieve the practical application. For example, embodiments of the present invention utilize an encrypted geohash to determine whether two (computing) clients (associated with individuals) have intersected at a given time. In various embodiments herein, program code executing on a (mobile) client will save a location to local storage when: 1) the program code obtains a new location; 2) an interval of event change is greater than a pre-determined interval (e.g., 30 s); 3) the program code detects at least one additional device within a pre-defined vicinity of the client (the vicinity can be based on the capabilities of the mobile client). When these conditions are met, the program code provide this location data to a server at a pre-defined interval. This interval can be adjusted by an administrator based on known transmission data related to the infection being tracked. Another element of the computing infrastructure is that enables the embodiments herein is at least one server that is communicatively coupled to or comprises a graph database. Program code executed by one or more processors of the server utilizes the graph database to store a user (associated with a client) as vertex and certain contacts as edges. To preserve data integrity, in some embodiments, the program code can reduce the number of edges. For example, if a contact between the same two users occurs more than once within a defined period of time (e.g., a day), the program code can only store one edge but update a meet time is the associated edge properties. The program code (executing on the server) can apply a Breadth First Search (BFS) algorithm to the graph generated in the graph database (which includes the vertexes (users) and nodes (relevant contacts)) to locate direct and indirect contacts. Program code utilizes a BFS algorithm to search a graph data structure for a node that meets a set of criteria. In BFS, the program code starts at a root of a graph and visits nodes at a current depth level before moving on to nodes at a next depth level. Another computing aspect that can contribute to the utility of the embodiments herein is at the server side, where the program code can send notifications to clients when an infection is suspected (based on the knowledge graph). The program code can also update the knowledge graph to indicate suspected cases. The embodiments herein can utilize a purger daemon to preserve data integrity as in some embodiments, the program code comprises a purger daemon which removes the past edges (based on a pre-defined maintenance schedule), so that stale exposure data does not impact the predictive aspects of the examples. Thus, the predictive model generated by the program code (e.g., the knowledge graph and the elements that generate the knowledge graph) is inextricably tied to computing and the predictive model is directed to a practical application.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as a code block for contact tracing between devices, which can be utilized for epidemiological reasons 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation and/or review to an end user, this recommendation would typically be communicated from network module 115 of computer 101 through WAN 102 to EUD 103. In this way, EUD 103 can display, or otherwise present, the recommendation and/or review to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation and/or review based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 is a general workflow 200 that illustrates various aspects of some examples described herein. FIG. 3, which will be discussed after FIG. 2, illustrates a technical architecture 300 implementing aspects of this workflow 200. As illustrated in FIG. 2, in embodiments of the present invention, program code executing on one or more processors (of a server or a group of servers in a computing environment, which can be a distributed environment such as a cloud computing environment) obtains location information from clients who have opted to participate in a contact tracing program. The clients can opt into the program by obtaining a geohash which is utilized by the program code to contact trace. The workflow 200 commences in this example when program code executing on one or more processors obtains a location of a client and stores the client location to local storage (210). The program code does not utilize GPS for location information, but, rather, an (e.g., irreversible) encrypted geohash instead of GPS indicates a location of a client. This technology also enables a faster determination, by the program code, of whether two clients had intersection at some time in addition to protecting the privacy of users associated with the clients from which the program code obtains location information. In some examples, the program code obtains the data because the client is configured to send the location data to the program code (executing on at least one server) every given time interval (e.g., a predetermined number of minutes). As illustrated in FIG. 3, the program code can obtain the location data from a web service periodically obtaining an encrypted geohash under defined circumstances (noted below) from a client subscribed to the service.

The program code saves the location data based on the location being new (for the client with a given time period), an interval having elapsed (e.g., 30 s), and the program code detects at least one additional device within a predefined vicinity of the client, e.g., an intersection between client devices. The program code can determine that a device/client is in a new location based on obtaining a change event. In some embodiments of the present invention, the program code utilizes the Bluetooth detection capabilities on the client (with client permission) to determine that there is another device within the vicinity of the client. The location data of the client comprises an encrypted geohash so the program code of the server, when obtaining matching geohashes from different devices, can determine that the devices are proximate to each other. However, the program code does not save an actual location of the server side and hence, protects the privacy of each client (user).

The encrypted geohash is part of the location data obtained by the program code. The location data can include an identifier of a user of the client (a unique identifier) that does not include personally identifiable information (PID). The program code accesses a graph database to store a client or user identifier (a user would be associated with each client) as a vertex (220). The program code determines if the client (vertex) intersected in real space with any other client (represented by other vertices) and stores data related to the intersection of the client and another client as an edge (230). In some examples, the graph database can comprise a distributed database, including but not limited to HBase and/or Cassandra. The graph database can persist billions of nodes and edges and can include data from a vast and possibly unlimited geographic area. Can serve all the countries. The data can be stored by the program code in a rich data format so that it can be readily utilized to infer a model to study characteristics of the infectious disease or virus being modeled by the program code.

In some embodiments, if the intersection between the devices is duplicative and occurred within a pre-defined interval, the program code does not generate a new edge in the graph database but instead updates an existing edge representing the interaction of the two devices with the more current intersection timing data. Based on storing a user (associated with a client) as a vertex and a contact as an edge, the program code can query the graph and the query will be efficient, performance-wise. In some examples, the program code sets the contact time and location as an index for a given vertex. The program code sets a contact date as a label for an edge. The program code can also partition the database based on zone.

In addition to the advantages that the encrypted geohash provides to client/user privacy, the encrypted geohash also enables the faster and more accurate saving and retrieval of location data by the program code. As aforementioned, if two individuals (clients) have the same encrypted geohash, they are very close. Thus, the program code executing on the server does not retain in the graph database an actual (real) location of each device but rather an encrypted value representing the location. To represent a location that the program code can utilize to determine contacts with other clients, the program code ignores second before a save to the local storage (e.g., the graph database). Thus, the program code saves, in the graph database, in the graph, to represent a location of a client at a given time, a geohash and a timestamp without seconds. The program code can utilize these saved values to determine whether a vertex has an edge in the graph database (e.g., whether there is a contact between two individuals based on their locations at a given time). The client can send a location list to the program code executing on the server every N minutes.

Figure 4:
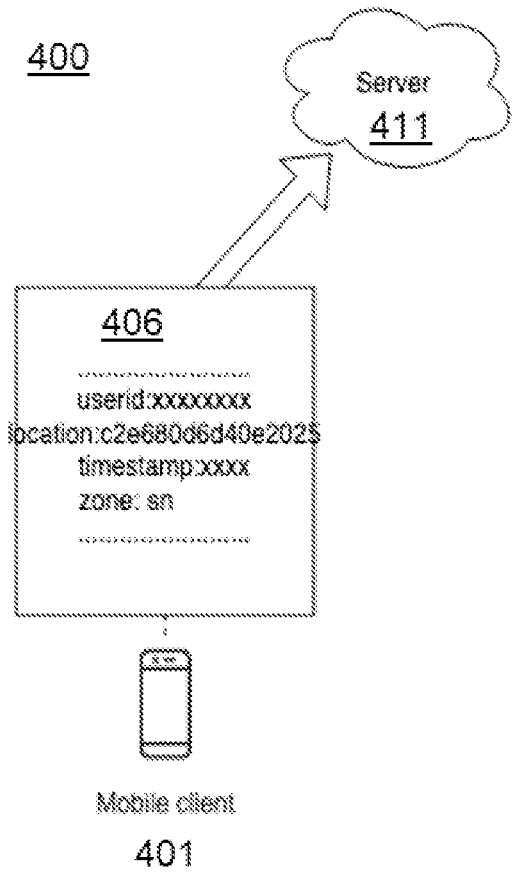
FIG. 4 illustrates some utilizations of an encrypted geohash in certain embodiments of the present disclosure.
Figure 5:
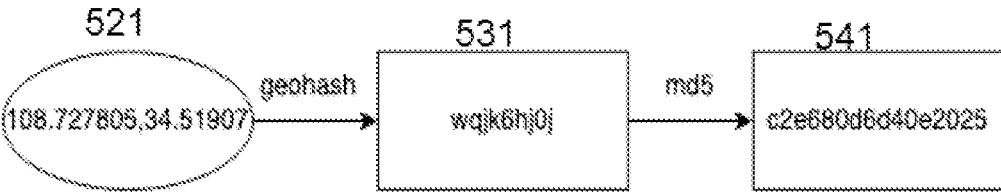
FIG. 5 illustrates some utilizations of an encrypted geohash in certain embodiments of the present disclosure.
Figure 6:
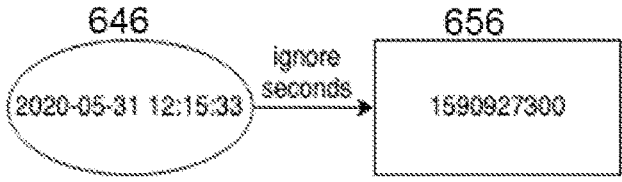
FIG. 6 illustrates some utilizations of an encrypted geohash in certain embodiments of the present disclosure.

FIG. 4 illustrates an encrypted geohash 400 in each client that the program code utilizes to obtain the location of a client (and of that client relative to other clients). Generally, a geohash is a convenient way of expressing a location using an alphanumeric string where the longer the string, the more precise the location. Because the geohash on each device is irreversibly encrypted when obtained by the program of the server and saved on the server side in its encrypted form, the server nor its accessible database include the actual location of the client in a manner discernable by another user accessing the database. As illustrated in FIG. 4, when the program code of the client 401 sends its location data 406 to the program code executing on the server 411 (which can be an application service interface (API) and/or an API interacting with a web service), the program code sends (or the program code of the server obtains via a web service), a user identifier (userid, to identify a user of the device without any personally identifiable information to protect privacy at the server side), a location as represented by an encrypted geohash, a timestamp (from when the location is obtained or sent), and a zone (e.g., a designator representing a distinct geographic area such as a state or a province). The program code saves the identifier (as the vertex), an encrypted geohash, and a timestamp. Thus, as illustrated in FIG. 5, the program code converts a real location 521 (e.g., coordinates) to a geohash 531 and the program code encrypts the geohash 541, in this non-limiting example, using the MD5 (message-digest) hashing algorithm. MD5 is a one-way cryptographic function that accepts a message of any length as input and returns as output a fixed-length digest value to be used for authenticating the original message. As illustrated in FIG. 6, in saving the timestamp, the program code obtains the timestamp 646 and strips the seconds for an altered timestamp 656, which the program code saves in a graph database.

Returning to FIG. 2, the program code identifies direct contacts and indirect contacts by applying a BLS algorithm to the graph generated by the program code in the graph database (240). The program code generates and sends real-time notifications based on identifying contacts and indirect contacts between clients based on the BLS algorithm-based analysis of the graph (250). Based on determining direct and in-direct contacts, the program code can update the graph with the suspected infection data (these data can also be utilized to send notifications) (260). To utilize current data to predict infections (as infection patterns can change over time), the program code can purge stale data (270). In some examples, the program code utilizes a purger daemon to remove past edges (based on a pre-defined maintenance schedule).

FIG. 3 is a system architecture 300 that includes aspects of the examples herein. In this example, a client 301 provides data via a web service (to which the client is subscribed) 303. More than one type of client 301 is illustrated in the architecture 301 as a user could utilize mobile clients and personal computing devices of various types to subscribe to the web service 303 to enable the client 301 to provide location data to program code executing on a server, which in this architecture 300 is designated a graph platform 305. The graph platform 305 comprises a query engine 307, an update engine 309, and a delete engine 311. The program code obtains location data from the clients 301 in the manner described in FIG. 2, for example, and saves the location data as well as user data in a graph database, depicted in FIG. 3 as database storage 313. The database storage 313 is partitioned into zones A-N 315a-315n. Each zone is a geographic area and the program code saves location data from each zone in a different partition. The number of zones in this architecture is provided as an example and for illustrative purpose and not to suggest any limitations. The program code of the graph platform 305, including the program code comprising the query engine 307, the update engine 309, and the delete engine 311 query, generate as well as update, and delete stale data (respectively) in a (knowledge) graph in the database storage 313. The deletion activities of the program code comprising the delete engine 311 can be controlled by a spark platform 317 where the program code comprises a purger job 319. The program code of the purger job 319 can control the delete engine 311 to delete edges from a past pre-configured number of days at pre-configured intervals.

Figure 7:
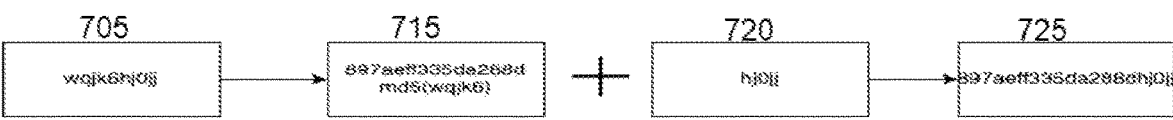
FIG. 7 illustrates an example of encrypting a geohash according to a rule utilized in some examples herein.

FIG. 7 illustrates an example 700 of encrypting a geohash according to a rule utilized in some examples herein. The geohash encryption is the location value provided to the program code of the server or obtained by the program code of the server, representing the location of a client. In this examples an encrypted geohash=MD5 (the first five words of geohash)+the last five words of geohash. Thus, to derive the encrypted geohash (725), as illustrated in FIG. 7, the program code obtains a geohash (705) and applies MD5 encryption to the first five words of a geohash (715) and then adds the last five words of the geohash (720). The program code retains a portion of the geohash in plaintext, in some examples (e.g., the last five characters), so that the program code can more easily compare a location of each client with the location of other clients to identify proximity and hence, contacts. Because program code can calculate a geohash using a fixed-sized box, one can take a given geohash and extract the neighboring boxes around it, in each direction. Various existing functions can be utilized by the program code to extract the geohashes of all neighbors and/or of individual neighbors, in order to identify contacts.

Figure 8:
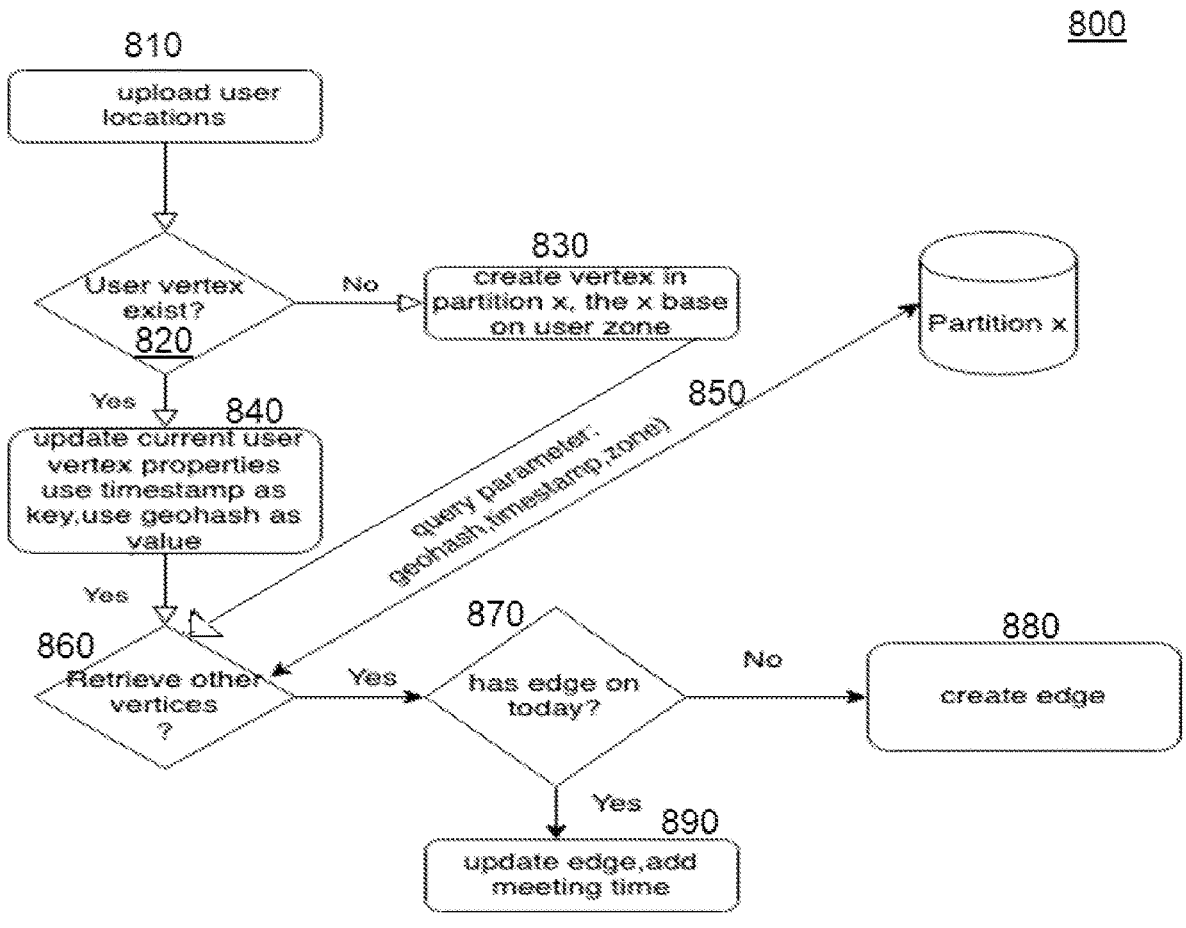
FIG. 8 is a workflow that illustrates how the program code (executing on the server side) ingests location data from clients and utilizes the data to trace contacts and predict outcomes.

FIG. 8 is a workflow 800 that illustrates how the program code (executing on the server side) ingests location data from clients and utilizes the data to trace contacts and predict outcomes. The program code obtains locations from clients (e.g., who have opted into contact tracing and in some instances, have subscribed to a web service) (810). As aforementioned, the client location data are encrypted geohashes. The program code determines whether each user identified in the location data exists as a vertex in the graph generated by the program code in the graph database (820). As illustrated in FIG. 4, these location data include a userid. For each client, the userid is the unique identifier of a user associated with the client. If the user does not exist in the existing vertices of the graph, the program code generates a vertex representing the user (830). The program code creates the vertex in a partition that coordinates with the zone in the location information. If a vertex for a given user does exist, the program code updates the user vertex properties with the location information, including utilizing the timestamp as a key the encrypted geohash as the location value (840). The program code then attempts to identify contacts between users based on querying values associated with vertices in the same partition (each zone is assigned to a given partition of the graph database in some examples). The program code queries (850) the partition relevant to each user (as each user is represented by a new or updated vertex) based on geohash, timestamp, and zone and retrieves vertices from the partition based on the parameters (860). The program code determines if there is an edge (contact) between vertices (users). Once the program code has identified vertices with geohashes zones, and comparable timestamps (within a window of each other for exposure based on known infection data), the program code determines if there is an existing edge within the time interval being tracked (e.g., a current day) (870). If there is no existing edge, the program code creates an edge in the graph representing a contact between at least two vertices (880). If there is an existing edge in the time interval, the program code updates the edge to add a most current meeting time between the users represented by the vertices (890).

Figure 9:
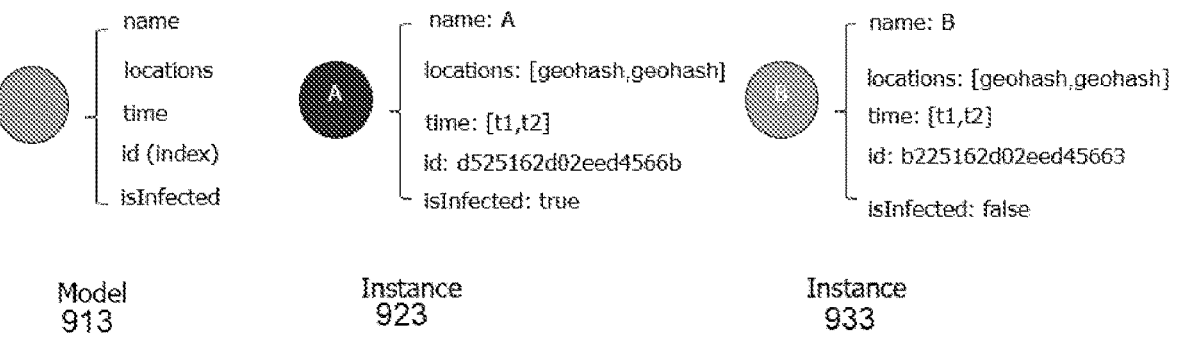
FIG. 9 illustrates a model and examples of instances in a graph generated by the program code in certain embodiments of the present disclosure.
Figure 10:
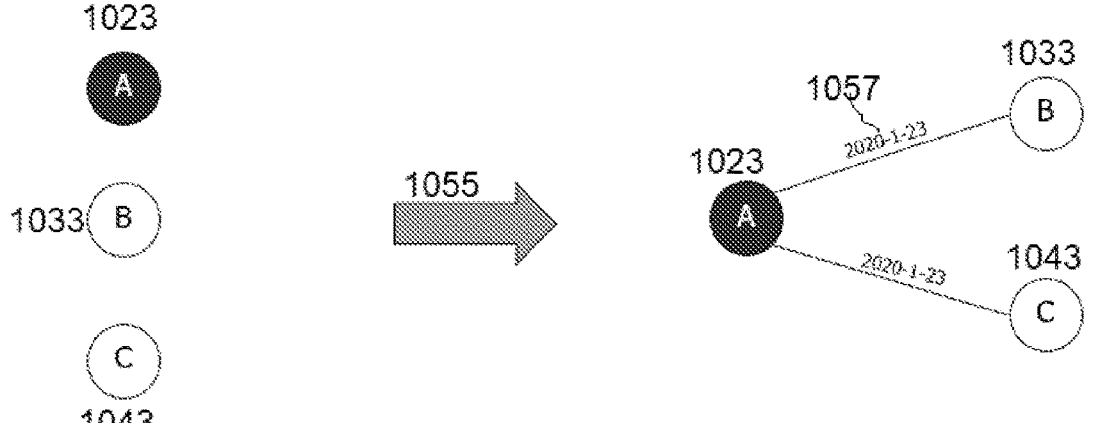
FIG. 10 illustrates various aspects of workflows practiced in some embodiments of the present disclosure.

FIG. 9 illustrates a model 913 and examples 923, 933 of instances in a graph generated by the program code in embodiments of the present invention. The model 913 illustrates that an instance (which can also be understood as a user) includes a name (for the purposes of the example), one or more locations (geohashes provided by the clients of a user), a time (timestamps of the respective location data), an identifier (index value), and whether the instance (user) indicates an infection (whether the user is infected). Examples 923 and 933 have values and indicate that instance A 923 (user A) is infected while instance B 933 (user B) is not. FIG. 10 illustrates how embodiments of the present invention use these instances or users in order to trace and anticipate progression of an infection.

FIG. 10 models when instance A 1023, which represented an infected case, comes into contact with instance B 1033 and instance C 1043, both of which are not infected. In this example, instance A 1023, a user who is infected, met instance (user) B 1033 and instance (user) C 1043 at a given location and on a given date, in this example, Jan. 1, 2020. From the data obtained from various clients (associated with users A, B, and C) the program code generates nodes (instances) A 1023, B 1033, and C 1043. The program code generates (1055) an edge label 1057 designating the date of the meeting (e.g., 2020 Jan. 23) between A 1023 and B 1033 and A 1023 and C 1043 based on the location and time intersection. The program code removed from these nodes or instances related location and time in the properties, because the program code has inferred that these instances (users) have had a contact and thus, the program code generates an edge in the graph database. The program code can utilize the edge label to query the date of the contact, if the instances have an edges that proves that the users met at some time. If the program code determines that the users have not met, there is no intersection.

As illustrated in FIG. 3, data partitions in the database storage 313 is based on zone. Generally, location data from a given geographic area (e.g., state, province, etc.) is saved in a given partition. By partitioning geographic data with definitive boundaries, the program code can reduce resources utilized in various computation. However, if a user, based on the location data from the user's device, travels across multiple compartmentalized (based on zone) geographic areas, the program code can add a user vertex in an additional partition. When the program code adds an edge between two vertices (as discussed relative to FIG. 10), the program code determines when the two vertices have the same encrypted geohash and timestamp at the same partition. If these elements are the same (e.g., encrypted geohash, timestamp, and partition), the program code generates an edge (indicating a contact between users). Otherwise, the program code does not generate an edge as the location data indicates that there has been no contact between the users.

Figure 11:
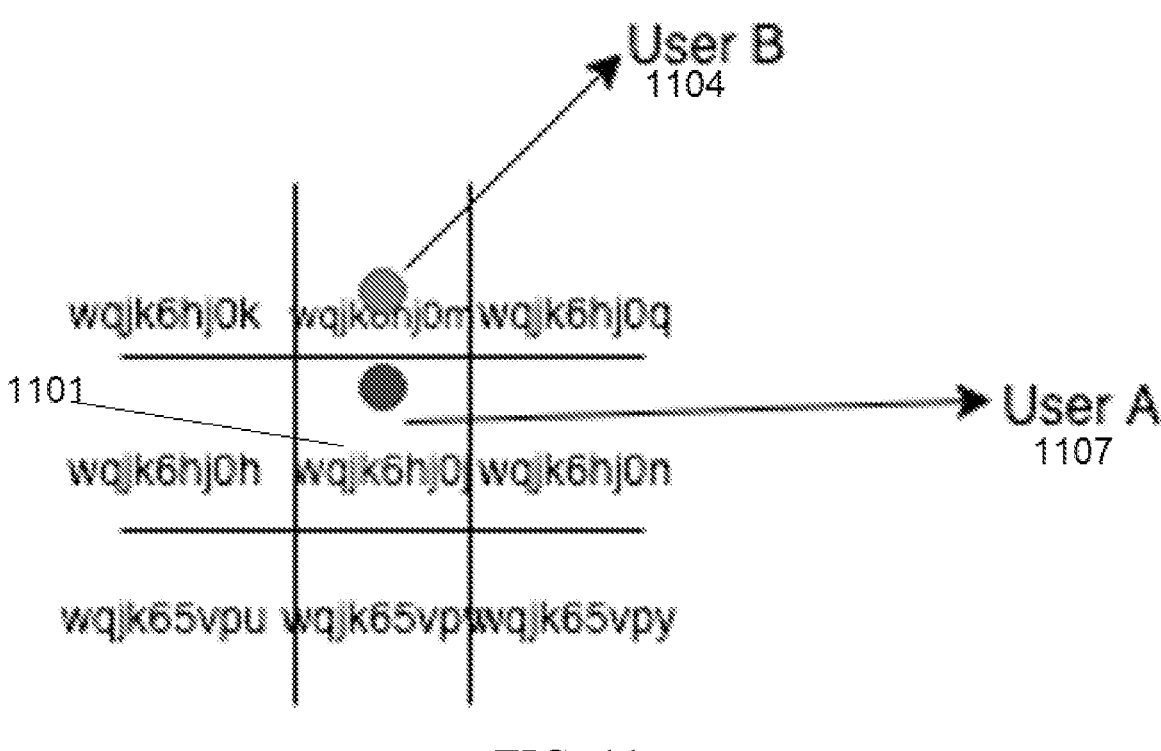
FIG. 11 illustrates a utilization of an encrypted geohash in certain embodiments of the present disclosure.

FIG. 11 illustrates a boundary issue when the program code determines whether a contact (and thus a possible transmission of an infectious disease) has taken place. The vertices that represent the users are saved in different partitions in a database to represent different physical geographic zones where the clients indicated that the users are located. Because there are boundary issues with geohashes, even if two vertices are very close, they may be located in two different areas and hence, in some examples, the program code queries areas to the left of each vertex (e.g., 8 areas). In FIG. 11, a current geohash 1101 is wqjk6hj0j and based on this geohash, the program code can determine that a User B 1104 is close to a User A 1107. In some embodiments, the program code can determine whether there are contacts by searching a match in another vertex for the current geohash 1101. However, this approach may not identify all proximate users, who are arguably close enough for transmission. Thus, in some examples, the program code checks if the geohash is equal to the left 8 geohashes (the geohashes in partitions surrounding). For example, if the precision of 10 characters geohash is 0.6 m, a geohash is a neighbor geohash. Thus, the program code can presume a reasonable closeness between the vertices. The program code can reduce the number of edges between the same users (to conserve storage space and eliminate duplicative data) by only generating a single edge within a given defined time period (e.g., a day) for the same two users, regardless of how many times they meet within the same time period.

Figure 12A:
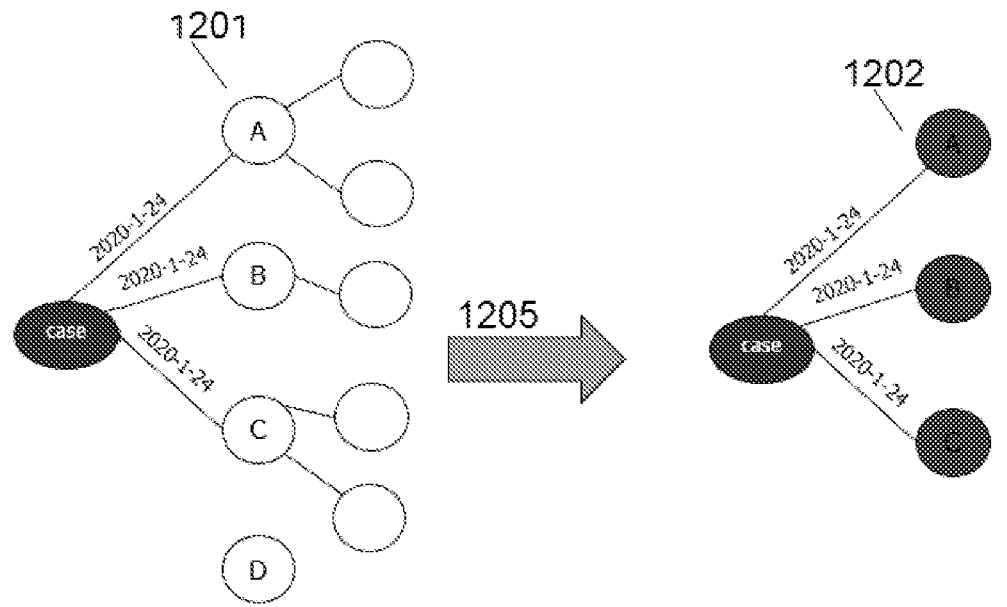
FIGS. 12A-12B (collectively FIG. 12 or FIG. 12) illustrate contact tracing as performed by program code in certain embodiments of the present disclosure.
Figure 12B:
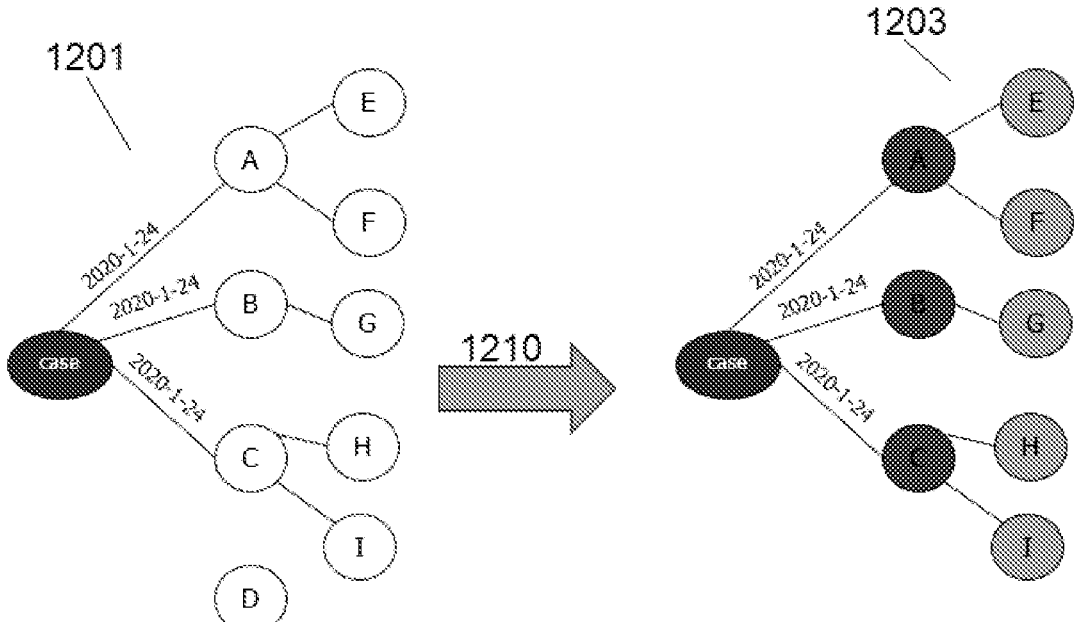

FIGS. 12A and 12B illustrate how the program code utilizes a graph 1201 generated by the program code to locate/model direct 1202 and indirect contacts 1203, respectively, in order to trace the progression of a given infectious disease. In FIG. 12A where the program code models direct contacts 1202 from a graph 1201 (1205), the program code utilizes a graph query to find a first level direct contacts based on their edge labels. The program code then filters the past N days contacts (e.g., assuming today is 2020 Jan. 24), and queries a pre-defined number of days (e.g., 5 days) of contacts, to find direct contacts between users A, B, and C. Equation 1 below illustrates the program code identifying and modeling the direct contacts illustrated in FIG. 12.

(Equation 1)

$g.V().has("user", "user\ A")$.

$$repeat(bothE().\ hasLabel(2020-1-24').otherV())\ ..toList()$$

In FIG. 12B, the program code utilizes a BFS algorithm 1210 to find the second level indirect contacts 1203. Hence, the program code can find the first and second level contacts. Because the program code can infer that A, B, C are direct contacts, E, F, G, H, and I are the indirect contacts in this example.

Examples herein include computer-implemented methods, computer program products, and computer systems for contact tracing where program code executing on one or more processors obtains location data from a client, where the location data comprises an identifier of a user utilizing the client, an encrypted geohash representing a physical location of the client at the obtaining, and a timestamp comprising a time of the obtaining. The program code stores, in a graphing database communicatively coupled to the one or more processors, a vertex representing the user, in a graph, wherein properties of the vertex comprise the location data. The program code determines, based on comparing the encrypted geohash and the timestamp of the vertex to values in one or more vertices in the graph, wherein each vertex of the one or more vertices represents an additional user, that at least one additional user intersected with the user in physical space proximate to a given time, wherein an encrypted geohash of at least one vertex representing the at least one additional user matches the encrypted geohash of the client and a timestamp of the at least one vertex representing the at least one additional user is within a predetermined interval of the timestamp of the client. The program code generates, between the vertex of the user and the at least one vertex representing the at least one additional user, an edge in the graph, where the edge represents a direct contact between the user and the at least one additional user. The program code applies, to the graph, a breath first search algorithm to the graph to identify one or more indirect contacts between users represented as vertices in the graph including indirect contacts between the user and other users represented as vertices.

In some examples the program code obtaining the encrypted geohash comprises: the program code obtaining a geohash representing the physical location of the client and the program code encrypting the geohash to generate the encrypted geohash, where a portion of the encrypted geohash is plain text.

In some examples, the encrypting comprises applying a message-digest hashing algorithm to the geohash.

In some examples, the program code storing the location data in the database comprises: the program code verifying that three pre-conditions related to the location data have been met, and based on the verifying, the program code proceeding with the storing.

In some examples, the preconditions comprise: the encryption geohash of the client differs from earlier obtained encryption geohashes from the client, a set interval of time has elapsed between the obtaining from a last time of obtaining location data from the client, and at the obtaining at least one additional device was within a pre-defined vicinity of the client.

In some examples, the program code generating or the updating the edge comprises: the program code determining, based on the determining that the at least one additional user intersected with the user in the physical space proximate to the given time, if the graph comprises the edge between the vertex and the at least one vertex, based on determining that the graph does not comprise the edge, the program code generating the edge with a label representing a date of the intersection, and based on the program code determining that the graph comprises the edge, the program code updating the label of the edge with the date of the intersection.

In some examples, the program code storing the vertex comprises: the program code determining if the vertex representing the user exists in the graph, based on the program code determining that the vertex does not exist, the program code implementing the vertex, and based on the program code determining that the vertex exists, the program code updating the properties of the vertex with the location data.

In some examples, the graphing database is partitioned: each partition of the graphing database comprises location data from a zone representing a geographic region (the location data from the client comprises a value representing a given zone). In some examples, the storing comprises the program code storing the vertex representing the user in a partition of the graphing database comprising data from the given zone.

In some examples, the program code determining that the at least one additional user intersected with the user in the physical space proximate to the given time comprises: the program code identifying, in the graphing database, the partition of the graphing database comprising the data from the given zone, and the program code querying vertices in the partition of the graphing database, with query parameters comprising the encrypted geohash and the timestamp of the vertex to determine the one additional user.

In some examples, the program code determining that the at least one additional user intersected with the user in the physical space proximate to the given time comprises: the program code identifying, in the graphing database, the partition of the graphing database comprising the data from the given zone, and the program code querying vertices in the partition of the graphing database and in partitions representing geographic regions within a given physical distance of the given zone, with query parameters comprising the encrypted geohash and the timestamp of the vertex to determine the one additional user.

In some examples, the program code determines based on properties of vertices in the graph, if any users in the direct contact and the indirect contacts are infected with an infectious disease, and the program code transmits an alert to the direct contact and the indirect contacts if one or more user in each contact of the direct contact and the indirect contact is infected.

In some examples, the program code continuously purged stale data in the graph; the stale data comprises data with a timestamp a pre-determined amount of time before a current time.

In some examples, the properties of the vertex comprise the timestamp and the program code storing the timestamp comprises the program code eliminating seconds in the timestamp in advance of the storing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method for contact tracing, the method comprising:

obtaining, by one or more processors, location data from a client, wherein the location data comprises an identifier of a user utilizing the client, a geohash representing a physical location of the client at the obtaining, and a timestamp comprising a time when the location data is obtained;

encrypting, by the one or more processors, a portion of the geohash to generate an encrypted portion of the geohash, wherein another portion of the geohash is unencrypted;

securely storing, by the one or more processors, in a graphing database communicatively coupled to the one or more processors, a vertex representing the user, in a graph, wherein properties of the vertex comprise the location data, wherein the location data comprises parameters including the identifier and the encrypted geohash, wherein the one or more processors cannot unencrypt the encrypted geohash to determine a precise location of the user;

determining, by the one or more processors, based on comparing the encrypted geohash and the timestamp of the vertex to values in one or more vertices in the graph, wherein each vertex of the one or more vertices represents an additional user, that at least one additional user intersected with the user in physical space proximate to a given time, wherein an encrypted geohash of at least one vertex representing the at least one additional user matches the encrypted geohash of the client and a timestamp of the at least one vertex representing the at least one additional user is within a predetermined interval of the timestamp of the client;

generating or updating, by the one or more processors, between the vertex of the user and the at least one vertex representing the at least one additional user, an edge in the graph, wherein the edge represents a direct contact between the user and the at least one additional user;

applying, by the one or more processors, to the graph, a breath first search algorithm to the graph to identify one or more indirect contacts between users represented as vertices in the graph including indirect contacts between the user and other users represented as vertices; and securely storing, by the one or more processors, the encrypted portion geohash, the unencrypted portion of the geohash, and the location data.

2. The method of claim 1, wherein the encrypting comprises applying a message-digest hashing algorithm to the portion of the geohash.

3. The method of claim 1, wherein the securely storing the location data in the database comprises:

verifying, by the one or more processors, that three pre-conditions related to the location data have been met; and based on the verifying, proceeding, by the one or more processors, with the securely storing.

4. The method of claim 3, wherein the preconditions comprise:

the encrypted geohash of the client differs from earlier obtained encrypted geohashes from the client, a set interval of time has elapsed between the obtaining from a last time of obtaining location data from the client, and at the obtaining at least one additional device was within a pre-defined vicinity of the client.

5. The method of claim 1, wherein the generating or the updating the edge comprises:

determining, by the one or more processors, based on the determining that the at least one additional user intersected with the user in the physical space proximate to the given time, if the graph comprises the edge between the vertex and the at least one vertex;

based on determining that the graph does not comprise the edge, generating the edge with a label representing a date of the intersection; and based on determining that the graph comprises the edge, updating the label of the edge with the date of the intersection.

6. The method of claim 1, wherein the securely storing the vertex comprises:

determining, by the one or more processors, if the vertex representing the user exists in the graph;

based on determining that the vertex does not exist, implementing, by the one or more processors, the vertex; and based on determining that the vertex exists, updating, by the one or more processors, the properties of the vertex with the location data.

7. The method of claim 1, wherein the graphing database is partitioned, wherein each partition of the graphing database comprises location data from a zone representing a geographic region, wherein the location data from the client comprises a value representing a given zone, and wherein the securely storing comprises storing the vertex representing the user in a partition of the graphing database comprising data from the given zone.

8. The method of claim 7, wherein the determining that the at least one additional user intersected with the user in the physical space proximate to the given time comprises:

identifying, by the one or more processors, in the graphing database, the partition of the graphing database comprising the data from the given zone; and querying, by the one or more processors, vertices in the partition of the graphing database, with query parameters comprising the encrypted geohash and the timestamp of the vertex to determine the one additional user.

9. The method of claim 7, wherein the determining that the at least one additional user intersected with the user in the physical space proximate to the given time comprises:

identifying, by the one or more processors, in the graphing database, the partition of the graphing database comprising the data from the given zone; and querying, by the one or more processors, vertices in the partition of the graphing database and in partitions representing geographic regions within a given physical distance of the given zone, with query parameters comprising the encrypted geohash and the timestamp of the vertex to determine the one additional user.

10. The method of claim 1, further comprising:

determining, by the one or more processors, based on properties of vertices in the graph, if any users in the direct contact and the indirect contacts are infected with an infectious disease; and transmitting, by the one or more processors, an alert to the direct contact and the indirect contacts if one or more user in each contact of the direct contact and the indirect contact is infected.

11. The method of claim 1, further comprising continuously purging, by the one or more processors, stale data in the graph, wherein the stale data comprises data with a timestamp a pre-determined amount of time before a current time.

12. The method of claim 1, wherein the properties of the vertex comprise the timestamp, wherein securely storing the timestamp comprises eliminating seconds in the timestamp in advance of the securely storing.

13. A computer system for contact tracing, the computer system comprising:

a memory; and one or more processors in communication with the memory, wherein the computer system is configured to perform a method, said method comprising:

obtaining, by one or more processors, location data from a client, wherein the location data comprises an identifier of a user utilizing the client, a geohash representing a physical location of the client at the obtaining, and a timestamp comprising a time when the location data is obtained;

encrypting, by the one or more processors, a portion of the geohash to generate an encrypted portion of the geohash, wherein another portion of the geohash is unencrypted;

securely storing, by the one or more processors, in a graphing database communicatively coupled to the one or more processors, a vertex representing the user, in a graph, wherein properties of the vertex comprise the location data, wherein the location data comprises parameters including the identifier and the encrypted geohash, wherein the one or more processors cannot unencrypt the encrypted geohash to determine a precise location of the user;

determining, by the one or more processors, based on comparing the encrypted geohash and the timestamp of the vertex to values in one or more vertices in the graph, wherein each vertex of the one or more vertices represents an additional user, that at least one additional user intersected with the user in physical space proximate to a given time, wherein an encrypted geohash of at least one vertex representing the at least one additional user matches the encrypted geohash of the client and a timestamp of the at least one vertex representing the at least one additional user is within a predetermined interval of the timestamp of the client;

generating or updating, by the one or more processors, between the vertex of the user and the at least one vertex representing the at least one additional user, an edge in the graph, wherein the edge represents a direct contact between the user and the at least one additional user;

applying, by the one or more processors, to the graph, a breath first search algorithm to the graph to identify one or more indirect contacts between users represented as vertices in the graph including indirect contacts between the user and other users represented as vertices; and securely storing, by the one or more processors, the encrypted portion geohash, the unencrypted portion of the geohash, and the location data.

14. The system of claim 13, wherein the encrypting comprises applying a message-digest hashing algorithm to the portion of the geohash.

15. The system of claim 13, wherein the securely storing the location data in the database comprises:

verifying, by the one or more processors, that three pre-conditions related to the location data have been met; and based on the verifying, proceeding, by the one or more processors, with the securely storing.

16. The system of claim 15, wherein the preconditions comprise: the encrypted geohash of the client differs from earlier obtained encrypted geohashes from the client, a set interval of time has elapsed between the obtaining from a last time of obtaining location data from the client, and at the obtaining at least one additional device was within a predefined vicinity of the client.

17. The system of claim 13, wherein the generating or the updating the edge comprises:

determining, by the one or more processors, based on the determining that the at least one additional user intersected with the user in the physical space proximate to the given time, if the graph comprises the edge between the vertex and the at least one vertex;

based on determining that the graph does not comprise the edge, generating the edge with a label representing a date of the intersection; and based on determining that the graph comprises the edge, updating the label of the edge with the date of the intersection.

18. A computer program product for identifying key emotional content in a text, the computer program product comprising:

one or more computer readable storage media and program instructions collectively stored on the one or more computer readable storage media readable by at least one processing circuit to:

obtain, by one or more processors, location data from a client, wherein the location data comprises an identifier of a user utilizing the client, a geohash representing a physical location of the client at the obtaining, and a timestamp comprising a time when the location data is obtained;

encrypt, by the one or more processors, a portion of the geohash to generate an encrypted portion of the geohash, wherein another portion of the geohash is unencrypted;

securely store, by the one or more processors, in a graphing database communicatively coupled to the one or more processors, a vertex representing the user, in a graph, wherein properties of the vertex comprise the location data, wherein the location data comprises parameters including the identifier and the encrypted geohash, wherein the one or more processors cannot unencrypt the encrypted geohash to determine a precise location of the user;

determine, by the one or more processors, based on comparing the encrypted geohash and the timestamp of the vertex to values in one or more vertices in the graph, wherein each vertex of the one or more vertices represents an additional user, that at least one additional user intersected with the user in physical space proximate to a given time, wherein an encrypted geohash of at least one vertex representing the at least one additional user matches the encrypted geohash of the client and a timestamp of the at least one vertex representing the at least one additional user is within a predetermined interval of the timestamp of the client;

generate or update, by the one or more processors, between the vertex of the user and the at least one vertex representing the at least one additional user, an edge in the graph, wherein the edge represents a direct contact between the user and the at least one additional user, apply, by the one or more processors, to the graph, a breath first search algorithm to the graph to identify one or more indirect contacts between users represented as vertices in the graph including indirect contacts between the user and other users represented as vertices; and securely store, by the one or more processors, the encrypted portion geohash, the unencrypted portion of the geohash, and the location data.

* * * * *